Patented Feb. 16, 1937

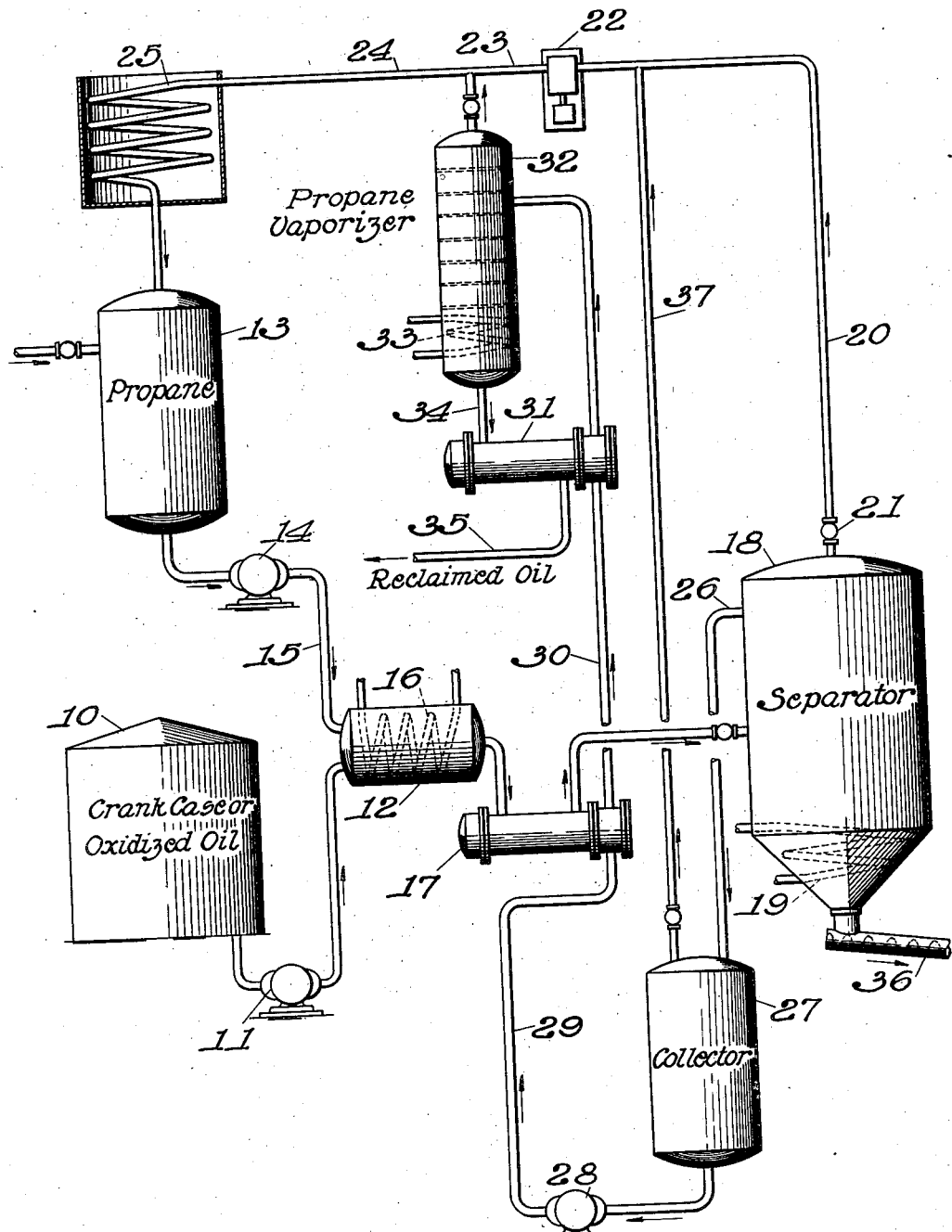

2,070,626

UNITED STATES PATENT OFFICE 2,070,626

METHOD OF TREATING AND RECLAIMING LUBRICATING OILS

Bernard H. Shoemaker, Hammond, Ind., assignor to Standard Oil Company, Chicago, Ill., a corporation of Indiana Application December 29, 1932, Serial No. 649,385

10 Claims. (Cl. 196—16)

This invention relates to a process for reclaiming used oil from the crankcase of automobiles or for separating and reclaiming components of oil mixtures which have been subjected to oxidizing conditions.

After an oil has been used in an automobile crankcase for a long period of time it becomes partially oxidized and contaminated by oxidation products, acidic substances, sludges, asphaltic matter, etc. Heretofore the expense of reclaiming these used crankcase lubricants has been so great that the process was not commercially feasible, and large amounts of valuable oil products have been thrown away as used lubricants.

The object of my invention is to reclaim the desirable components of used crankcase oil, and also to separate and reclaim oxidation products when may be formed therein. The invention is also applicable to the separation and recovery of oxidation products from oil which has been purposely oxidized for the production of aldehydes, alcohols, acids and other hydrocarbon derivatives.

I have discovered that the desirable components of a used crankcase oil or oxidized oil can be separated from undesired components by means of liquefied propane. It has heretofore been believed that hexane completely precipitates asphaltic matter from petroleum oils. However, I have found that whereas hexane only precipitated 0.4% of sludge from a spent crankcase oil, propane precipitated 12%, and the propane sludge contained not only asphaltic matter but acids and other oxidation products. Furthermore, I have discovered that the oil which is extracted from used crankcase lubricant by means of propane has better color, both before and after claying, has a lower acidity, and has much greater sludging stability than oil which is separated therefrom in other manners.

In practicing my invention I intimately mix the used crankcase oil or oxidized oil with propane, separate the mixture into two liquid layers, and separately recover the diluent and desirable constituents of each layer. The invention will be more clearly understood from the following detailed description and from the accompanying drawing which forms a part of this specification and which represents diagrammatically my improved oil reclaiming system.

I prefer to use commercial propane as my treating agent. Commercial propane may contain ethane, ethylene, isobutane, propylene, normal butane, etc. It should be understood that I contemplate the use of any of these liquefied normally gaseous light hydrocarbons or mixtures thereof, or any diluents of similar properties. In the following specification and claims I will refer to liquefied normally gaseous hydrocarbons as "propane", although they may contain other liquefied normally gaseous light hydrocarbons in any proportions.

Used crankcase oil or oxidized oil from storage tank 10 is forced by pump 11 to mixer 12, wherein it is intimately mixed with propane from storage tank 13, pump 14 and pipe 15. The mixer may be provided with suitable baffles (not shown) or with a steam coil 16, or both, the purpose being to obtain an intimate mixture and a sufficient time of contact to permit solution of the desirable oil by the propane. The temperature of the mixture may be anywhere from about 30–100° F., but I prefer to operate at about room temperature. The solution is then passed through heat exchanger 17 into separator 18, which may be a large cylindrical vessel provided with a hopper bottom and with suitable coils 19, through which heating or cooling fluids may be circulated. I prefer to effect separation at relatively low temperatures, usually below 30° F. and preferably at —40° F., the boiling temperature of propane, and I may effect this cooling by removing propane vapors through pipe 20 and valve 21, and forcing these vapors by pump 22 through pipes 23 and 24 to condenser 25, the propane being liquefied therein and returned to the storage tank 13.

The propane-oil solution is continuously withdrawn through pipe 26 to collector 27. From this collector the mixture is forced by pump 28 through pipe 29, heat exchanger 17, pipe 30 and heat exchanger 31 to propane vaporizer 32 which is provided with suitable steam coil 33. The oil now substantially free from propane is passed through pipe 34, heat exchanger 31 and pipe 35 to a suitable storage tank.

The asphaltic matter, oxidation products, tarry matter and other undesirable constituents of the used crankcase lubricant are withdrawn from the base of the separator by means of screw conveyor 36, which leads to a suitable recovery system.

Instead of cooling the material entirely in separator 18 I can cool collector 27 by venting vapors therefrom through pipe 37, and then cool the incoming mixture to the desired temperature in exchanger 17. Other expedients will be apparent to those skilled in the art.

I will refer to the oxidation products, sludges, asphaltic materials, etc. as undesirable products, but this term is so used with reference only to used lubricating oils. The oxidation products may in some cases be more valuable than the purified lubricating oil, and this is particularly the case when oil is purposely oxidized to form alcohols, acids, aldehydes and other oxidation products. All of these oxygen-containing compounds are substantially insoluble in propane, especially at low temperatures, and by this simple expedient I may accomplish the very difficult task of separating oxidation products from petroleum oils. These products are valuable in the preparation of resins, varnishes, detergents, emulsifying agents and other organic chemicals. They may be made by oxidizing oils, paraffin wax, etc. with a current of air at a temperature of 300–500° F. After the separation of the product, the oil or unchanged wax is returned to the oxidation zone.

The invention is particularly attractive when used to reclaim crankcase lubricants, because the reclaimed oil has better color, lower acidity and better stability against sludging than the oil would otherwise have, even if it were extracted with hexane. In some cases, the oil will need no further treatment but I contemplate a slight acid treating, caustic washing, claying, or other finishing processes where these are found to be desirable.

While I have described in detail a preferred embodiment of my invention, it should be understood that I do not limit myself to the details therein set forth except as defined by the following claims which should be construed as broadly as the prior art will permit.

I claim:

1. The method of reclaiming used crankcase lubricating oils which comprises intimately mixing said oils with liquefied propane, separating the propane-soluble from the propane-insoluble substances, and removing propane from the propane-soluble substances.

2. The method of claim 1 wherein the mixture is cooled to a temperature below 30° F. prior to the separation of propane-soluble from propane-insoluble substances.

3. The process of claim 1 wherein the propane-soluble oil is subjected to a clay treatment after its separation from propane-insoluble substances.

4. The process of claim 1 wherein the propane-soluble oil is subjected to an acid treating process after its separation from propane insoluble substances.

5. The process of claim 1 wherein the propane-soluble oil is subjected to an acid treating process and a clay treating process after its separation from propane insoluble substances.

6. The method of treating lubricating oils which comprises subjecting said oils to drastic oxidation conditions to produce propane-insoluble substances of the type produced in crankcase lubricating oils under conditions of use, and then intimately mixing said oils with liquefied propane, separating the propane-soluble from the propane-insoluble substances, and removing propane from the propane-soluble substance.

7. The method of claim 6 wherein the mixture is cooled to a temperature below 30° F. prior to the separation of propane-soluble from propane-insoluble substances.

8. The process of claim 6 wherein the propane-soluble oil is subject to a clay treatment after its separation from the propane-insoluble substances.

9. The process of claim 6 wherein the propane-soluble oil is subjected to an acid treating process after its separation from propane-insoluble substances.

10. The process of claim 6 wherein the propane-soluble oil is subjected to an acid treating process and a clay treating process after its separation from propane-insoluble substances.

BERNARD H. SHOEMAKER.